United States Patent [19]

Wood, III

[11] 3,744,018
[45] July 3, 1973

[54] METHOD OF AND APPARATUS FOR PRODUCING A REPETITIVE SEISMIC IMPULSE

[75] Inventor: Charles D. Wood, III, San Antonio, Tex.

[73] Assignee: Southwest Research Institute, San Antonio, Tex.

[22] Filed: Dec. 22, 1971

[21] Appl. No.: 210,764

[52] U.S. Cl. .......................... 340/12 SD, 181/.5 NC
[51] Int. Cl. .......................................... H04b 13/00
[58] Field of Search .......................... 340/12 SD, 12; 181/.5 NC, .5 XC

[56] References Cited
UNITED STATES PATENTS
3,397,755   8/1968   Loper .............................. 181/.5 NC
3,506,085   4/1970   Loper .............................. 181/.5 NC

*Primary Examiner*—Benjamin A. Borchelt
*Assistant Examiner*—H. J. Tudor
*Attorney*—James F. Weiler, William A. Stout and Dudley R. Dobie, Jr. et al.

[57] ABSTRACT

The improvement in the method and apparatus of producing a seismic source in water by a combustive explosion by reducing the oscillation of the explosive exhaust gas bubble in the water thereby reducing extraneous seismic impulses. Injecting an air/fuel mixture of less than the stoichiometric quantity into the chamber to provide an excess of air, and after the mixture has been exploded and released into the water, injecting additional fuel into the free air in the exhaust gases which provides additional combustion to increase the pressure in the exhaust gases to dampen the oscillation of the pressure in the gases. Injecting additional fuel into the hot exhaust gases and excess air for maintaining the exhaust gas bubble pressure at or above the water pressure surrounding the exhaust gases.

6 Claims, 6 Drawing Figures

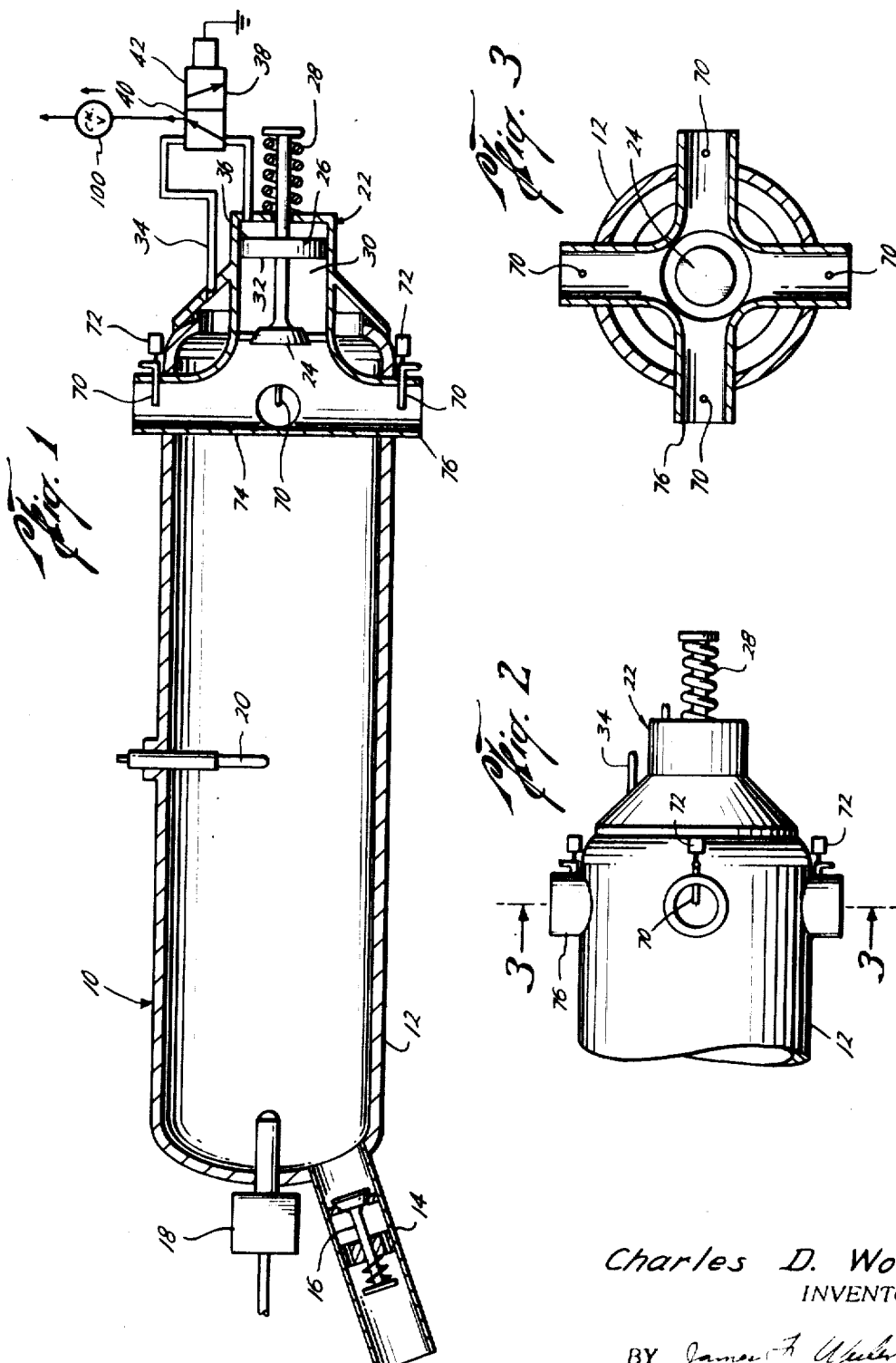

Charles D. Wood
INVENTOR.

BY

ATTORNEYS 3,744,018

METHOD OF AND APPARATUS FOR PRODUCING A REPETITIVE SEISMIC IMPULSE

BACKGROUND OF THE INVENTION

Generally, it is old to provide a pneumatic or a combustive fuel/air explosion for providing a repetitive seismic impulse in water. However, as noted in U.S. Pat. No. 3,397,755, secondary pressure pulses normally occur upon the release of pressurized air into water caused by the oscillation in size of the air bubble. Similarly, underwater seismic sources that produce seismic impulses by the release of a combustive air/fuel explosion also form an oscillating exhaust gas bubble which expands and contracts to cause undesirable periodic energy impulses in the water after the initial impulse. These extraneous impulses confuse the information obtained from the selected pulse being measured. The present invention is directed to reducing or eliminating the oscillation of the hot exhaust gas bubble from the combustion chamber to thereby eliminate or reduce the undesired seismic impulses caused by the oscillation.

SUMMARY

The present invention is directed to a method and apparatus for reducing exhaust gas oscillations in a seismic impulse produced in water by a combustive fuel/air explosion by injecting a hydrocarbon fuel and air into the combustion chamber in a mixture less than stoichiometric thereby providing additional or free air after exploding the mixture, and releasing the exhaust gases into the water, injecting additional fuel into the free air in the exhaust gases to cause further explosions to increase the pressure within the exhaust gases for damping the oscillations of the gases.

The present invention is further directed to injecting additional fuel into the free air in the released exhaust gases in a rate and amount to maintain the gas pressure in the exhaust gases at least as great as the water pressure surrounding the exhaust gases.

A still further object of the present invention is the provision of exhaust ducts in communication with the exhaust valve in the combustion chamber of a combustive type seismic source into which additional fuel can be injected into the exhaust gases for eliminating or reducing the undesired energy pulses transmitted to the water by the exhaust gases.

BRIEF DESCRIPTION OF THE DRAWINGS

FIG. 1 is an elevational view, in cross section, and partly schematic, illustrating the apparatus of the present invention, FIG. 2 is a fragmentary elevational view, showing the exhaust discharge end of the combustion chamber of FIG. 1, FIG. 3 is a cross sectional view taken along the line 3—3 of FIG. 2.

DESCRIPTION OF THE PREFERRED EMBODIMENT

Figure 4:
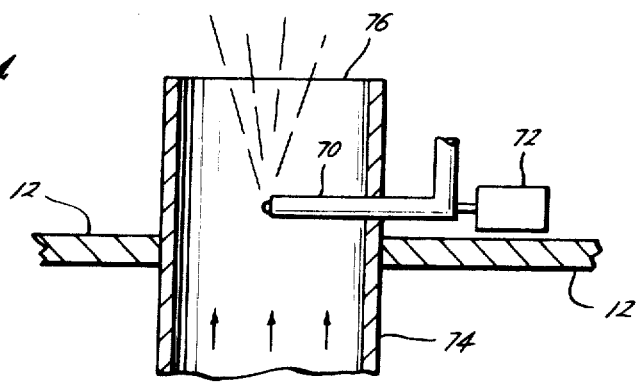
FIG. 4 is an enlarged fragmentary cross sectional view illustrating the injection of additional fuel into the exhaust gases of the apparatus of FIG. 1.

Referring now to FIG. 1, the apparatus 10 of the present invention is provided to produce a seismic shock in water for the purpose of seismic prospecting and generally includes a combustion chamber 12, air supply means 14 for injecting compressed air into the chamber 12, and fuel injection means 18 for injecting a hydrocarbon fuel, preferably diesel fuel. The air supply means 14 for introducing compressed air may include a check valve 16 and the pressure of the air introduced may be approximately 300 psi, but can be in the range from about 200 to 600 psi. When the combustion chamber 12 is charged with air, the fuel injecting means 18 such as a solenoid valve opens to allow a finely atomized spray of diesel fuel to enter into the chamber 12. A supply of pressurized diesel fuel is maintained at the inlet of the solenoid operated fuel valve 18 so that the quantity of injected fuel can be controlled by the length of time the fuel delivery valve 18 remains open.

If the combustion chamber 12 is hot from previous firings and if the entering air temperature is sufficiently high, the injected diesel fuel will ignite spontaneously with a short delay between fuel entry and ignition. However, if the chamber 12 is cold, additional ignition means such as a heater element 20 may be provided inserted through the wall of the combustion chamber 12 to initiate combustion. Under these circumstances, the fuel is ignited and burns, raising the temperature and pressure in the combustion chamber, for example, to approximately 5,000° F. and 1,500 psi, respectively.

An exhaust valve generally indicated by the numeral 22 is located in the combustion chamber 12 to release the hot explosive exhaust gases into the water to provide a seismic impulse. The exhaust valve 22 may include a poppet valve 24 attached to a piston 26 and includes a spring 28 acting to normally close the poppet valve 24. Pressure in the combustion chamber 12 is transmitted to chamber 30 and acts on the back side of the poppet valve 24 and on side 32 of the piston 26. Since piston 26 is greater in cross-sectional area than the back side of the poppet valve 24, the poppet valve 24 remains closed. However, a control line 34 in communication between the combustion chamber 12 and the back side 36 of piston 26 is provided and the flow therein is controlled by solenoid valve 38. When the valve 38 is in position 40 as shown, the pressure acting on the side 36 of piston 26 is equal to that of the surroundings and the poppet valve 24 is closed. Check valve 100 prevents the entry of water into the volume above the piston 32. However, when the solenoid valve 38 is placed in position 42 in the line 34, pressure from the combustion chamber 12 is transmitted to side 36 of the piston 26 balancing the forces on the piston 26 allowing the poppet valve 24 to open, and release the explosive gases from the chamber 12. The exhaust gases cause a pressure wave in the surrounding water which is useful for seismic prospecting. The apparatus 10 is capable of continuous, repetitive explosions at a rate dependent upon the quantity of compressed air available up to a minimum of about two explosions per second.

Figure 5:
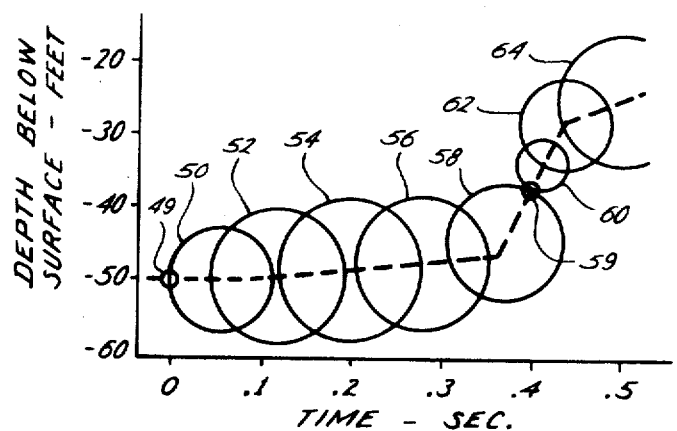
FIG. 5 is a graph illustrating the oscillation of the bubble size of exhaust gases from the apparatus of FIG. 1.
Figure 6:
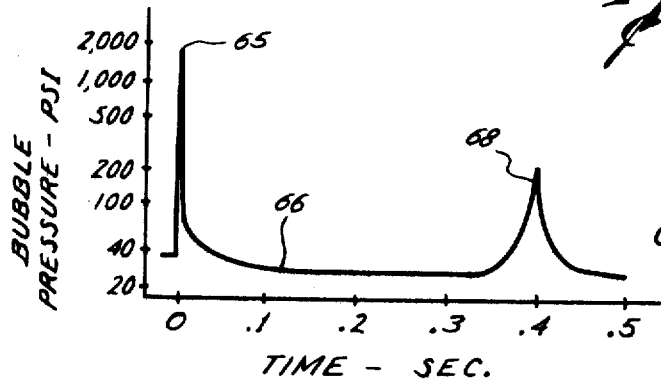
FIG. 6 is a graph illustrating variation of pressure versus time as the exhaust gases bubble oscillates as shown in FIG. 5.

Underwater seismic sources that produce energy by the release of a gas into the water have been found to produce an energy pulse of large amplitude and for this reason are widely used for seismic exploration. However, this type of source has a significant disadvantage. When the exhaust gases are released into the water a gas bubble forms and grows in size while the gases are being fed into it. As the bubble grows, the inertia of the moving mass of water around the bubble causes the gas bubble to continue growing so that the gas pressure in the bubble may fall well below the surrounding pressure of the water. Then, because of the lower pressure within the bubble, the bubble begins to contract. Again due to the inertia of the water surrounding the gas bubble, the contraction continues past the point at which the gas pressure equals the water pressure and therefore the pressure in the gas bubble is raised to a valve well above the water pressure. The diameter of the bubble at this stage is correspondingly small. A typical oscillation is seen in FIG. 5 of a graph showing changes in diameter of an exhaust gas bubble. Thus the exhaust gases from the combustion chamber 12 form a gas bubble 99 at the time the exhaust gases are released through the exhaust valve 22. However, the inertia of the moving water away from the bubble allows the bubble to increase in size at positions 50, 52 and 54, at which time the pressure in the bubble has fallen below that of the surrounding pressure of the water. The bubble is contracting due to the greater water pressure at positions 56, 58 and 59. Thus at position 59, the gas pressure in the bubble is greater than the pressure of the water and the bubble then again begins to expand at positions 60, 62 and 64. These oscillations of the size of the bubble cause periodic impulses in the water after the initial pulse 65, as best seen in the graph 66 of FIG. 6. The extraneous pulses resulting from the oscillations of the bubble, such as pulse 68, are undesirable and confuse the information obtained from the reflected pulses from the strata at the bottom of the water.

The present invention is directed to damping the oscillation of the exhaust gas bubbles and thereby reduce or eliminate the undesired periodic energy impulses produced by the exhaust gases after the initial pulse. Thus, the fuel/air mixture supplied to the combustion chamber 12 is provided in less than the stoichiometric quantity to provide a supply of air or oxygen in the exhaust gases after combustion. This may be obtained by charging the combustion chamber with air in the usual manner; but reducing the amount of fuel injected so that after combustion is completed, there remains in the chamber a certain amount of air containing oxygen which is not burned. The exhaust gases, now also containing free or unburned oxygen, are released through the exhaust valve 22. Adjacent the exhaust valve 22 one or more small fuel injectors 70 are provided to spray fuel into the hot exhaust gases being released from the combustion chamber 12 at a controlled rate. While any suitable means may be used to operate the injector valves 70; by way of example only, solenoid valves 72 may be provided connected to and controlling the injector valves 70 and in time are suitably controlled and programmed. Thus, for example, the injectors 70 may be initiated and controlled by an electrical signal automatically programming the solenoid valves 72 using the opening of the exhaust valve 22 as a reference. The fuel from the injectors 70 burns by combining with the oxygen or free air in the hot exhaust gases thereby increasing the pressure within the bubble during its expansion to build up pressure therein to prevent contraction of the bubble thereby damping the oscillation of the exhaust gas bubble. The rate and amount of fuel injected is controlled by the surrounding water pressure and the injector characteristics, and is preadjusted to produce the maximum damping effect on the volume of gas released by the seismic energy source at the normal operating depth of the source. In any event, the fuel injection into exhaust gases is such that the oscillation of the bubble of exhaust gases is prevented or reduced to eliminate or reduce the energy pulses transmitted to the water by the oscillating bubble by maintaining the exhaust bubble pressure at or above the pressure of the water surrounding the gas exhaust bubble.

Preferably, an exhaust duct 74 is in communication between the exhaust valve 22 and the water and includes one or more outlets 76, and the output from the fuel injectors 70 is directed to spray fuel into the duct 70 thereby insuring that the fuel combines with the exhaust gases and free air at a location where the pressures and temperatures are conducive to ignition of the added fuel.

In use, the apparatus 12 is towed through the water by a suitable vessel (not shown). A conventional air compressor, fuel pump and suitable controls (not shown) are on the towing vessel and the combustion chamber is connected to the vessel by a towing cable. At the desired location, air is introduced into the combustion chamber 12 through the air supply means 14 and fuel is sprayed therein such as through fuel injection valve 18 and ignited, if necessary, by ignition means 20 to cause an explosion therein. As previously mentioned, the fuel/air mixture is less than the stoichiometric quantity in order to insure that a certain amount of oxygen in the free air remains after combustion of the fuel is completed. The exhaust valve 22 is actuated by the solenoid valve 38 to open the poppet valve 24 and exhaust the hot explosive gases into the water through the duct 74 and outlets 70 to provide a seismic impulse. Additional fuel is injected into the free air carried by the exhaust gases to provide additional combustion thereby maintaining the gas pressure in the exhaust gas bubble at least as great as the pressure of the water surrounding the gas bubble.

It is believed that the method of the present invention is apparent from the foregoing description of the apparatus. However, the method comprehends reducing the gas oscillations in a seismic impulse produced in water by a combustive explosion by injecting air and diesel fuel under pressure into a combustion chamber in a fuel/air mixture less than stoichiometric, exploding the mixture, releasing the explosive gases and free air through an exhaust valve and into the water to provide a seismic impulse, and injecting additional diesel fuel into the explosive gases and free air for maintaining the released gas pressure in the gas bubble at least as great as the pressure of the water surrounding the gas.

The present invention, therefore, is well adapted to carry out the objects and attain the ends and advantages mentioned as well as others inherent therein.

What is claimed is:

1. A method of producing, for the purposes of seismic surveying, a pressure wave in water by a combustive explosion having reduced gas oscillations comprising, injecting a hydrocarbon fuel and air into a combustion chamber in a fuel/air mixture less than stoichiometric thereby providing excess air, exploding the mixture,
releasing the explosive gases into the water through an exhaust valve,
injecting additional fuel into the released explosive gases including excess air thereby increasing the pressure within the gases for damping the oscillations of the gases.

2. The method of claim 1 wherein,
the additional fuel is injected with reference to the actuation of the exhaust valve.

3. The method of claim 1 wherein,
the rate and amount of additional fuel injected is to maintain the exhaust gas pressure at least as great as the water pressure.

4. A method of reducing gas oscillations in a seismic impulse produced in water by a combustive explosion comprising,
injecting air and diesel fuel under pressure into a combustion chamber in a fuel/air mixture less than stoichiometric thereby providing excess free air,
exploding the mixture,
releasing the explosive gases and free air from the chamber through an exhaust valve and into the water to provide a seismic impulse, and
injecting additional diesel fuel into the explosive gases and free air for maintaining the released gas pressure at least as great as the pressure of the water surrounding the gas.

5. An apparatus for producing seismic pulses in water comprising,
a combustion chamber for contacting the water and having an exhaust valve,
first means for injecting a hydrocarbon fuel and air under pressure into the combustion chamber in a fuel/air mixture less than stoichiometric,
means for exploding the mixture,
means for opening the exhaust valve and releasing the explosive gases into the water,
second fuel injection means positioned adjacent the exhaust valve for injecting additional fuel into the explosive gases, and
control means for controlling the second injection means for maintaining the pressure in the explosive released gas at least as great as the pressure of the water surrounding the released gases.

6. The apparatus of claim 5 including,
an exhaust duct in communication between the exhaust valve and the water and into which the fuel from the second fuel injection means is directed.

* * * * *